E. LETORD.
CONTROLLING GEAR FOR AEROPLANES.
APPLICATION FILED NOV. 13, 1917.
1,316,905.
Patented Sept. 23, 1919.
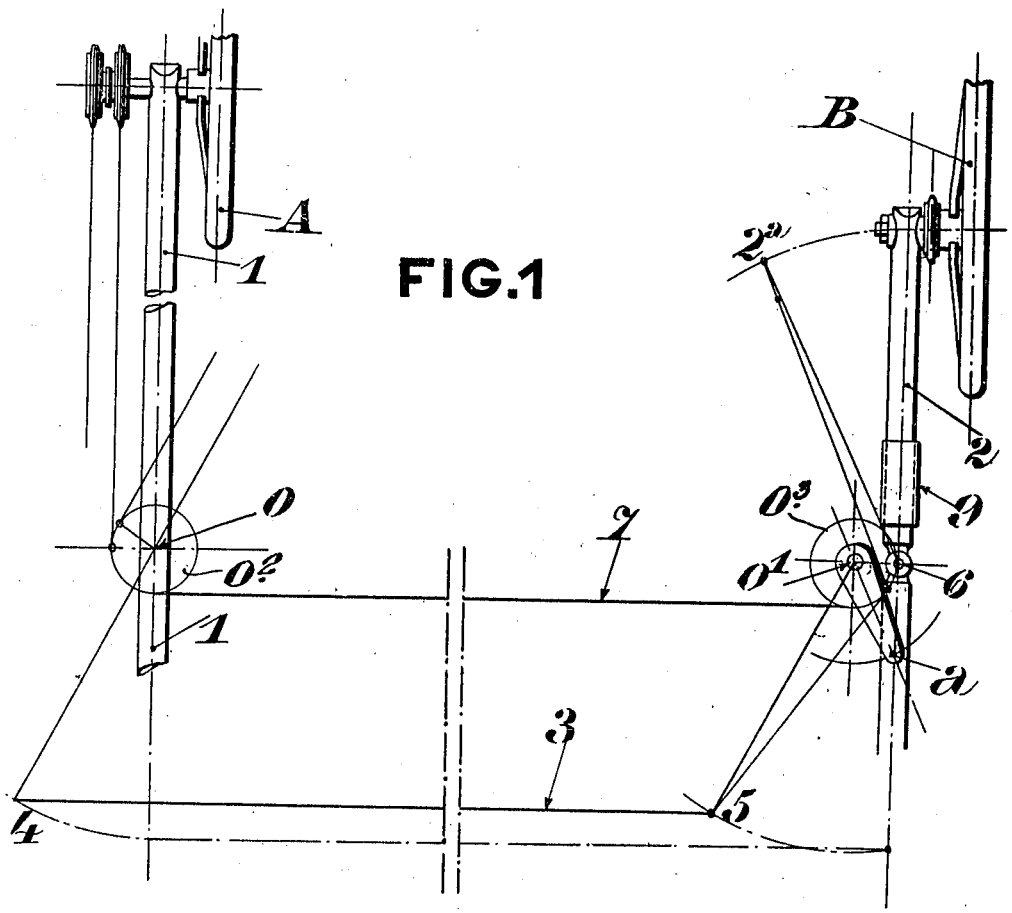
FIG.1
FIG.2
FIG.3
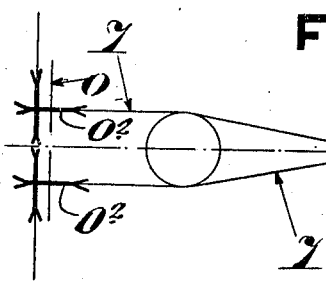
Witnesses
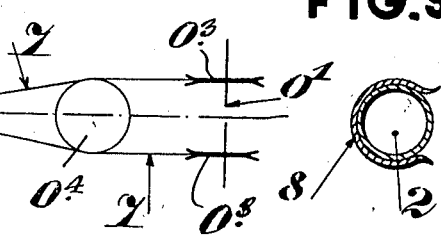
Inventor
Emile Letord

UNITED STATES PATENT OFFICE.

EMILE LETORD, OF MEUDON, FRANCE.

CONTROLLING-GEAR FOR AEROPLANES.

1,316,905.  Specification of Letters Patent.  Patented Sept. 23, 1919.

Application filed November 13, 1917. Serial No. 201,841.

*To all whom it may concern:*

Be it known that I, EMILE LETORD, a citizen of the French Republic, residing at Meudon, Seine-et-Oise, in France, have invented certain new and useful Improvements in Controlling-Gears for Aeroplanes, of which the following is a specification.

The invention relates to dual control mechanism for aeroplanes, and its object is to provide convenient means whereby one of the control levers or sticks can, when not required for use, be put out of operation in a position in which it does not obstruct the pilot.

The invention is illustrated in the accompanying drawing, in which:—

Figure 1 shows the general arrangement of the mechanism,

Fig. 2 being a diagram showing part of the mechanism in plan view, and

Fig. 3 a cross section of a detail.

The mechanism includes a forward control lever 1 and a rearward control lever 2, the lever 1 being for the use of the principal pilot, and the lever 2 for the use of a relief pilot. A rod 3 connects the lower ends 4 and 5 of the two levers, so that the levers rock fore and aft in unison, the rocking movement serving to actuate a vertical direction rudder. The lever 1 is mounted upon a shaft $o$, and the lever 2 is rigidly fixed to a short arm $a$ mounted upon a shaft $o^1$. Upon the shafts $o$ and $o^1$ are mounted pulleys $o^2$ and $o^3$ respectively, guiding a crossed cable 7 which passes around pulleys $o^4$ between the shafts $o$ and $o^1$ and connects the two hand wheels A and B to each other so that they rotate together in the same direction. The hand wheels control the ailerons.

The lever 2 is made in two parts, connected to each other above the arm $a$ by a hinge or pivot 6. Upon this lever there is a slidable sleeve 9, which can be slid downward from the position shown in Fig. 1, to cover the pivot 6 and rigidly engage the upper lever member with the lower lever member, this being done when the relief pilot desires to use the lever for controlling the machine. When the lever 2 is not required for this purpose, the sleeve 9 is slid upward to the position shown in Fig. 1, and the upper lever member is then rocked forward on the pivot 6 to the position 2ª, in which it engages a fixed spring socket 8 in which it can slide as shown in Fig. 3, and is thus held out of the way of the relief pilot, leaving the lower member free to rock on the pivot 6, in conjunction with the lever 1.

The distance between the parallel axes of the shaft $o^1$ and pivot 6 is equal to the radius of the pulley $o^3$, and the axis of the pivot 6 approximately coincides with that part of the diameter of the pulley at which the cable 7 in its upward course to the wheel B, leaves the pulley, so that the independent forward movement of the upper lever member, when the lever is flexed, does not cause any appreciable pull to be exerted on the cable, or in other words, does not tend to alter the length of the cable.

What I claim as my invention and desire to secure by Letters Patent of the United States is:—

In a controlling gear of the character described, a first control lever for governing the vertical direction rudder of the machine, a second control lever for the same purpose and lockable in the same vertical plane as said first lever, said second lever being formed of an upper and a lower part, a hinge connecting said parts, a sleeve slidable on said second lever for making said parts rigid, a rod connecting said levers so that they move in unison, a hand wheel on said first control lever, a hand wheel on the upper part of said second lever, a crossed cable imparting uniform movement to said hand wheels, pulleys for supporting said cable, means for securing the upper part of said second lever in a forwardly turned down position, and means for assuring the constant length of said cable in any position of said levers.

In witness whereof I have signed this specification in the presence of two witnesses.

EMILE LETORD.

Witnesses:
JESAN GERMAIN,
MARIN VACHON.

Copies of this patent may be obtained for five cents each, by addressing the "Commissioner of Patents, Washington, D. C."